United States Patent Office 2,844,617
Patented July 22, 1958

2,844,617

PRODUCTION OF NEUTRAL ESTERS OF ORTHOPHOSPHORIC ACID

Heinz Jonas, Leverkusen-Wiesdorf, and Werner Thraum, Leverkusen-Schlebusch, Germany, assignors to Farbenfabriken Bayer Aktiengesellschaft, Leverkusen, Germany, a corporation of Germany No Drawing. Application August 14, 1953
Serial No. 374,431

Claims priority, application Germany August 23, 1952

4 Claims. (Cl. 260—461)

The present invention relates to a new process of producing neutral esters of orthophosphoric acid.

Tri-esters of orthophosphoric acid have heretofore in general been produced by reacting alcohols and phosphorus oxychloride. Other processes have been described, which comprise the treatment of tri-esters of phosphorous acid in homogeneous phase with oxidation agents, for instance $SO_3$ and $NO_2$. These processes are cumbersome since they necessitate subsequent removal of acid impurities from these products by washing.

In accordance with the invention we have found that tri-esters of phosphorous acid can be converted into the corresponding orthophosphoric acid esters by a simple and smooth reaction by treating tri-esters of phosphorous acid with aqueous solutions of salts of hypochlorous acid. It is a surprising feature of the invention that this reaction—in spite of the two reaction components being insoluble or substantially insoluble in one another—proceeds at high velocity if care is taken that the two liquids are intimately mixed for instance by stirring. It has further been shown that the loss of esters due to saponification during the reaction, which in general takes place under alkaline conditions, is neglible and that even the acid impurities which are present in most technical phosphorous acid esters are converted for the greater part into the aqueous phase during oxidation with hypochlorite. The yield of orthophosphoric acid ester is almost quantitative, based on the phosphorous acid ester employed. The process of the invention allows of reacting either aliphatic or aromatic esters of phosphorous acid.

The reaction is generally carried out at room temperature or lower temperatures, preferably continuously.

After the reaction is complete the oily orthophosphoric acid ester is allowed to settle, separated, dried and distilled. Very pure products which are especially free from acid impurities are obtained.

The invention is further illustrated by the following examples:

Example 1

Into 2.2 litres of about 4.8 N NaOCl solution with about 0.2 N alkali, 1.4 kg. of trichloroethyl phosphite are gradually introduced with stirring, the temperature being kept at 0–10° C. by external cooling. After mixing the components, further quantities of hypochlorite are added if necessary until KI starch paper is dyed a full blue shade and the mixture is allowed to react for a further 15 minutes at room temperature. The oil is then separated from the aqueous solution in a separating funnel, dried and distilled. About 1.4 kg. of trichloroethyl phosphate having a sharp boiling point are obtained.

Example 2

Into a reaction vessel of iron, which is equipped with a cooling condenser, 17.6 kg. of tricresyl phosphite prepared from cresol and phosphorus trichloride and 22 litres of about 4.8 N solution hypochlorite solution are simultaneously introduced per hour, the reaction temperature being maintained between 45–50° C. and the mixture being vigorously stirred. The effluent from the reaction vessel is passed through 1 or 2 reaction vessels equipped with stirring means, the mixture is then allowed to settle and the oil is separated from the aqueous phase. After drying, and if necessary distilling, about 17 kg. of tricresyl phosphate of excellent quality are obtained per hour.

We claim:

1. A process of producing a neutral, water-insoluble ester of orthophosphoric acid which comprises intimately contacting a water-insoluble ester selected from the group consisting of alkyl and alkaryl tri-esters of phosphorous acid and halogen derivatives thereof, with an aqueous solution of a salt of hypochlorous acid at a temperature between about 0 and 50° C.

2. A process of producing a neutral, water-insoluble ester of orthophosphoric acid which comprises intimately contacting a water-insoluble ester selected from the group consisting of alkyl and alkaryl tri-esters of phosphorous acid and halogen derivatives thereof with an aqueous solution of the sodium salt of hypochlorous acid at a temperature between about 0 and 50° C.

3. A process in accordance with claim 2 in which said tri-ester of phosphorous acid is trichloroethyl phosphite and in which said temperature is maintained at 0–10° C.

4. A process in accordance with claim 2 in which said tri-ester of phosphorous acid is tricresyl phosphite and in which said temperature is maintained between 45–50° C.

References Cited in the file of this patent

Kosolapoff, Organophosphorus Compounds, Wiley (1950), pages 231–232.

UNITED STATES PATENT OFFICE
CERTIFICATE OF CORRECTION

Patent No. 2,844,617

July 22, 1958

Heinz Jonas et al.

It is hereby certified that error appears in the printed specification of the above numbered patent requiring correction and that the said Letters Patent should read as corrected below.

Column 2, line 19, for "solution", first occurrence, read -- sodium --.

Signed and sealed this 21st day of October 1958.

(SEAL)
Attest:

KARL H. AXLINE
Attesting Officer

ROBERT C. WATSON
Commissioner of Patents